US008885499B2

(12) United States Patent
Ponnuswamy

(10) Patent No.: US 8,885,499 B2
(45) Date of Patent: Nov. 11, 2014

(54) SPECTRUM-AWARE RF MANAGEMENT AND AUTOMATIC CONVERSION OF ACCESS POINTS TO SPECTRUM MONITORS AND HYBRID MODE ACCESS POINTS

(75) Inventor: Subburajan Ponnuswamy, Cupertino, CA (US)

(73) Assignee: Aruba Networks, Inc., Sunnyvale, CA (US)

( * ) Notice: Subject to any disclaimer, the term of this patent is extended or adjusted under 35 U.S.C. 154(b) by 206 days.

(21) Appl. No.: 13/080,548

(22) Filed: Apr. 5, 2011

(65) Prior Publication Data

US 2011/0243021 A1    Oct. 6, 2011

Related U.S. Application Data

(60) Provisional application No. 61/321,210, filed on Apr. 6, 2010, provisional application No. 61/321,179, filed on Apr. 6, 2010, provisional application No. 61/321,214, filed on Apr. 6, 2010.

(51) Int. Cl.
*H04L 12/26* (2006.01)
*H04W 24/08* (2009.01)
*H04L 12/24* (2006.01)
*H04W 24/10* (2009.01)
*H04W 72/00* (2009.01)
*H04W 84/12* (2009.01)

(52) U.S. Cl.
CPC ............... *H04W 24/08* (2013.01); *H04L 41/22* (2013.01); *H04L 43/08* (2013.01); *H04W 24/10* (2013.01); *H04W 72/00* (2013.01); *H04W 84/12* (2013.01)
USPC ......................................... 370/252

(58) Field of Classification Search
CPC ...... H04W 24/08; H04W 72/00; H04W 84/12; H04L 41/22; H04L 43/08
USPC .......... 370/252, 241, 332, 338, 447; 375/224, 375/E1.033; 455/67.11, 226.1, 456.1
See application file for complete search history.

(56) References Cited

U.S. PATENT DOCUMENTS

| 6,463,287 | B1 | 10/2002 | Wegner |
| 6,850,735 | B2 | 2/2005 | Sugar et al. |
| 7,079,812 | B2 | 7/2006 | Miller et al. |
| 7,184,777 | B2* | 2/2007 | Diener et al. ............. 455/456.1 |
| 7,460,837 | B2 | 12/2008 | Diener |
| 7,596,181 | B2 | 9/2009 | Chang et al. |
| 7,633,901 | B2 | 12/2009 | Yuen et al. |
| 7,653,020 | B2* | 1/2010 | Roberts ....................... 370/318 |
| 7,715,800 | B2 | 5/2010 | Sinha |
| 7,929,508 | B1 | 4/2011 | Yucek et al. |
| 7,940,794 | B2* | 5/2011 | Zhang et al. ................. 370/468 |
| 8,340,578 | B2 | 12/2012 | Tolentino et al. |

(Continued)

*Primary Examiner* — Hassan Kizou
*Assistant Examiner* — Amy Ling
(74) *Attorney, Agent, or Firm* — Varun A. Shah

(57) ABSTRACT

Methods of operating devices on a wireless network as access points (AP) or spectrum monitors (SM). An adaptive radio management (ARM) process operating on the digital network senses network conditions based on data from APs and SMs on the network, and in response to conditions changes devices from AP operation to SM operation, and from SM operation back to AP operation. A method for providing wideband spectrum analysis functions on a radio operating as an AP on a channel proving client connectivity services. A method for scanning off-channel for shorter durations between transmissions to collect spectral data and a method for explicitly quieting IEEE 802.11 transmissions on a channel to collect spectral data.

12 Claims, 1 Drawing Sheet

(56) References Cited

U.S. PATENT DOCUMENTS

| | | |
|---|---|---|
| 8,457,023 B2 | 6/2013 | Norlén et al. |
| 2002/0041622 A1* | 4/2002 | Steed et al. ............... 375/132 |
| 2002/0191564 A1 | 12/2002 | Kuo |
| 2004/0013128 A1* | 1/2004 | Moreton et al. ........... 370/447 |
| 2004/0023674 A1 | 2/2004 | Miller |
| 2004/0028003 A1* | 2/2004 | Diener et al. .............. 370/319 |
| 2004/0028123 A1* | 2/2004 | Sugar et al. ............... 375/224 |
| 2004/0137915 A1 | 7/2004 | Diener et al. |
| 2004/0185861 A1* | 9/2004 | Domon et al. ............. 455/450 |
| 2004/0208133 A1 | 10/2004 | Jay et al. |
| 2005/0059400 A1 | 3/2005 | Jagadeesan et al. |
| 2005/0111415 A1* | 5/2005 | Soomro et al. ............ 370/338 |
| 2005/0159109 A1* | 7/2005 | Kivekas et al. ............ 455/67.11 |
| 2005/0227625 A1* | 10/2005 | Diener ...................... 455/67.7 |
| 2006/0079286 A1* | 4/2006 | Ochi et al. ................ 455/562.1 |
| 2006/0089149 A1* | 4/2006 | Kizu et al. ................. 455/450 |
| 2008/0025259 A1 | 1/2008 | Ponnuswamy et al. |
| 2008/0151751 A1 | 6/2008 | Ponnuswamy et al. |
| 2008/0200195 A1 | 8/2008 | Abe et al. |
| 2008/0227401 A1 | 9/2008 | Scherzer et al. |
| 2008/0279093 A1 | 11/2008 | Hassan et al. |
| 2009/0003413 A1* | 1/2009 | Jang et al. ................. 375/135 |
| 2009/0310497 A1 | 12/2009 | Wakamatsu |
| 2010/0075704 A1* | 3/2010 | McHenry et al. .......... 455/509 |
| 2010/0118695 A1* | 5/2010 | Shellhammer et al. ..... 370/225 |
| 2010/0124886 A1 | 5/2010 | Fordham et al. |

* cited by examiner

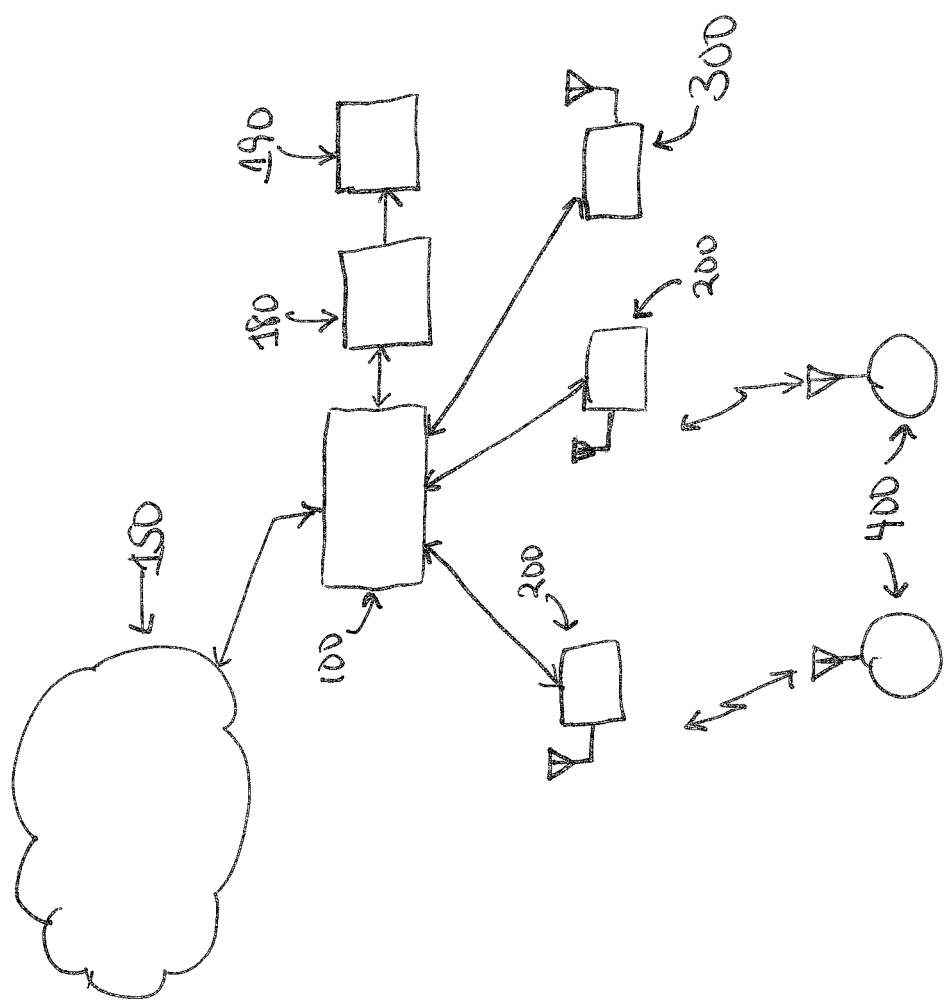

SPECTRUM-AWARE RF MANAGEMENT AND AUTOMATIC CONVERSION OF ACCESS POINTS TO SPECTRUM MONITORS AND HYBRID MODE ACCESS POINTS

CROSS-REFERENCES TO RELATED APPLICATIONS

This application claims the benefit of priority on U.S. Provisional Patent Application No. 61/321,210 filed Apr. 6, 2010 and entitled "Automatic conversion of access points to spectrum monitors and hybrid mode access point", U.S. Provisional Patent Application No. 61/321,179 filed Apr. 6, 2010 and entitled "Measuring and displaying wireless network quality", and U.S. Provisional Patent Application No. 61/321,214 filed Apr. 6, 2010 and entitled "Displaying a Wideband spectrum using a narrowband receiver", all incorporated herein by reference.

BACKGROUND OF THE INVENTION

The present invention relates to wireless digital networks, and in particular, to converting devices such as access points in a wireless network to spectrum monitors, and to RF spectrum management using spectrum information.

Wireless digital networks are becoming ubiquitous in enterprises, providing secure and cost-effective access to resources. Those networks usually have one or more controllers, each controller supporting a plurality of access points (AP) deployed through the enterprise. WiFi networks operating in accordance with IEEE 802.11 standards are examples of such networks.

Unfortunately, the frequencies used by these networks are shared. They are shared not only among the wireless networks themselves, but also with other non-network radiators. Non-network radiators, devices such as microwave ovens, wireless audio and video streaming devices, cordless phones, Bluetooth devices and the like, as well as other wireless networking devices, can cause interference with the operation of a network. Interfering devices can come and go, change their nature, and move around. As an example, replacing or adding a microwave oven in an employee lounge area can dramatically alter the interference present to a network. Wireless networks need the ability to detect, classify, and work around such interference sources.

In searching out sources of interference to a wireless network, various pieces of test equipment such as spectrum analyzers are used. A professional spectrum analyzer has a calibrated receiver of exquisite sensitivity, and is able to display and measure signals over a wide range of frequencies and amplitudes. They are also expensive and require a skilled operator. This places them outside the realm of the normal wireless network environment.

What a digital wireless network does have is a plurality of access points, each of which contains one or more antennas and radios, a combination of a transmitter and a receiver, designed to operate on the frequencies used for the wireless network. A wireless network may also have one or more air monitors (AM) and/or spectrum monitors (SMs), which in many cases are re-purposed APs. While these radios may not have the performance of a high quality spectrum analyzer, they are capable of collecting data on portions of the spectrum used by the network.

What is needed are tools in the wireless network to switch devices between AP or AM operation and Spectrum Monitor (SM) operation, and if possible to use these devices in hybrid AP/SM modes, providing information to a management process which operates the network in the presence of interference.

BRIEF DESCRIPTION OF THE DRAWINGS

The invention may be best understood by referring to the following description and accompanying drawings that are used to illustrate embodiments of the invention in which:

FIG. 1 shows a wireless network.

DETAILED DESCRIPTION

Embodiments of the invention relate to methods of switching a device on a wireless network from operating as an Access Point (AP) to a Spectrum Monitor (SM) under control of an RF management system such as ARM (Adaptive Radio Management), and operating such devices in a hybrid AP/SM mode.

FIG. 1 shows a network in which controller 100 communicates with a digital network such as the Internet 150. Controller 100 also supports devices such as access points (AP) 200 and spectrum monitors (SM) 300. Wireless client devices 400 connect to APs 200 and access services such as the Internet 150 through controller 100.

Also shown in FIG. 1 is adaptive radio management (ARM) process 180 and display 190. While shown as a separate device communicating with controller 100, the ARM process may operate within controller 100, or on any suitable computing device attached to the network.

As is known to the art, controller 100, APs 200, and spectrum monitor 300 are purpose-made digital devices, each containing a processor, memory hierarchy, and input-output interfaces. In one embodiment of the invention, a MIPS-class processor such as those from Cavium or RMI is used. Other suitable processors, such as those from Intel or AMD may also be used. The memory hierarchy traditionally comprises fast read/write memory for holding processor data and instructions while operating, and nonvolatile memory such as EEPROM and/or Flash for storing files and system startup information. Wired interfaces are typically IEEE 802.3 Ethernet interfaces, used for wired connections to other network devices such as switches, or to a controller. Wireless interfaces may be WiMAX, 3G, 4G, and/or IEEE 802.11 wireless interfaces. In one embodiment of the invention, controllers and APs operate under control of a LINUX operating system, with purpose-built programs providing host controller, access point, and/or air and spectrum monitor functionality.

Wireless client devices 400 contain a processor, memory hierarchy, and a number of interfaces including a wireless interface for communicating with APs 200. Typical wireless client devices include personal computers, handheld and tablet computers, Wi-Fi phones, wireless barcode scanners, and the like.

According to the present invention, a wireless digital network comprises a controller and one or more access points (AP). Each AP has at least one IEEE 802.11 radio, and software to support IEEE 802.11 wireless clients. An Air Monitor (AM) is similar to an AP but does not support wireless clients. A spectrum monitor (SM) consists of an IEEE 802.11 radio and software that is capable of performing spectrum analysis on a wide band, while optionally providing additional services such as interference classification, air monitoring, packet capture and Wireless Intrusion Prevention (WIP) functions.

An Access Point (AP) continuously observes the channel conditions on the channel of its operation (hereafter called the home channel). Similarly, an Air Monitor (AM) observes the channel conditions on all channels it scans as part of AM operation. Since the AP and AM may not have access to spectrum data, channel conditions can be estimated from indications of possible interference, such as the increase in measured noise floor, CRC errors, PHY errors, channel busy indications, and changes in transmission rate.

This operational data from APs, as well as data from AM and SM devices on the network is monitored by the ARM. When one of these trigger conditions are met, and if it is determined that the wireless connectivity coverage in that neighborhood can be handled by other radios, the ARM chooses to convert one or more of the radios into SMs. Prior to such conversion, the ARM adjusts the channels and transmit powers on the neighboring APs to increase local coverage, if necessary, so as not to create a coverage hole when one or more of the radios is converted into SMs. The number and type of clients and activity levels of the clients, if any, connected to the radios are taken into consideration before a decision to convert to an SM is made. Control of whether a radio can be automatically converted into an SM may be through a configuration parameter.

Once an AP is converted into an SM, the ARM may decide to convert it back to an AP. The decision to convert back to an AP is based on the current interference level observed by the SM as well as the amount of load in the neighborhood APs. If the interference level is below a threshold, and the load on the neighboring APs exceed a specified threshold, ARM converts the SM back to AP to provide services to clients.

In Hybrid AP/SM mode, a radio provides spectrum analysis functions, including interference classification, while providing client connectivity. Spectrum analysis data in the form of Fast Fourier Transform (FFT) information is processed along with 802.11 packets to support spectrum analysis on the home channel of the AP. At a minimum, the hybrid AP/SM provides spectrum analysis functions for a narrow band such as the 20 MHz or 40 MHz channel used by the AP.

In order to provide wideband spectrum analysis and support displays of a wideband spectrum in hybrid AP/SM, mode, the FFT information is gathered during the time the AP goes off channel to gather RF management information. While ARM scanning is optimized for the purpose of collecting Wi-Fi frame information for RF management purposes, FFT information may also be collected during ARM scans.

In addition, a new scanning method that scans other channels for shorter duration more frequently than ARM scanning is employed to collect spectrum (FFT and noise) information from other channels. Such short duration scans may be accomplished between beacons or other frame transmissions.

Depending on the number and type of clients connected to the AP as well as the amount of client activity, the hybrid AP/AM may choose to use the IEEE 802.11 Quiet element or a similar feature, or transmit CTS or CTS-to-Self frames to quiet the BSS or the entire channel prior to scanning off channel for a longer period of time to capture more FFT or other spectrum information from other channels. Note that while CTS-to-Self was introduced with IEEE 802.11g as a protection feature to allow an AP to protect transmissions, in the present invention the transmission of a CTS or CTS-to-Self frame is not used to protect transmission, but to quiet other devices operating locally on the same channel.

The hybrid AP/SM or the dedicated SM or the SM converted from an AP may choose to transmit an CTS or IEEE 802.11 Quiet element on a specific channel and collect FFT samples on that channel to more accurately estimate the non-WiFi interference activity. Again, the CTS transmission is being used to quiet the channel. This method allows the SM to actively prevent all other Wi-Fi transmissions for a specific period of time within a BSS or the entire channel in order to measure non-Wifi activity. The frequency of CTS or Quiet element transmissions depends on the activity level on that channel, classification requirements and configuration parameters. The interference classifier may also request the SM to issue a CTS or Quiet element to obtain FFT information on a channel without any Wi-Fi activity.

In hybrid AP/SM mode, when the radio scans other channels, either for a short duration or for a longer duration, the collected FFT information is used to construct the Real-time FFT, FFT Average and FFT Duty cycle of a wideband spectrum. In order to construct a real-time FFT, the hybrid radio has to scan a channel at least once every update interval or extrapolate information from less frequent scans. Since the typical FFT sampling time is very small (e.g., 4 microseconds), a hybrid radio providing client services is able to scan multiple channels with very short scans within a display interval.

The ARM RF management function typically uses information gathered from Wi-FI frames to make decisions. With spectrum analysis enabled, ARM has additional information that is used to make intelligent RF management decisions. The interference classifier in an SM is able to identify the type of interferer along with other parameters associated with the interferer, such as the frequency usage (e.g., fixed frequency or frequency hopper), occupied bandwidth, center frequency, and duty cycle.

The ARM makes RF management decisions based on the interference type information. As an example, microwave oven interference detected around lunch time is used to avoid channels that may get affected by microwave ovens for a specific period of time. Once the microwave oven activity is no longer detected, these channels are reused to distribute the load and minimize co-channel interference. On the other hand, if occasional microwave oven activity is detected, ARM may decide not to switch channels depending on the activity on other channels, if the microwave oven interference is not expected to last longer.

ARM may also make decisions to change channels based on the type of Microwave. For example, the residential microwave oven with a single magnetron has about 50% duty cycle and therefore, wireless transmission can co-exist with these types of devices if the transmissions are scheduled during the Microwave oven's OFF time. On the other hand industrial Microwave ovens with two magnetrons or the inverter based Microwave ovens have a duty cycle closer to 100% making the channels unusable for wireless communication during the time these devices are active. Since the classifier is able to accurately classify the type of Microwave oven, ARM uses the classification information to make the appropriate RF management decision.

When a frequency hopping interferer such as a frequency hopping digital phone is detected on any channel in 2.4 GHz band, unless there are other indications of interference, ARM decides not to take this into account while making RF management decisions (e.g., decision to change channels), since it is known that the frequency hopper affects all channels in this band equally. On the other hand, if a frequency hopping interferer is detected on the upper 5 GHz band (e.g., 5.7 to 5.8 GHz), ARM avoids using the channels within that band, if possible, and instead chooses to use channels within other 5 GHz bands that are not affected by the frequency hopper.

When fixed frequency devices with close to 100% duty cycle are detected by the classifier on a specific channel(s), such as wireless audio and/or video bridges, ARM uses this information to avoid using the specific channel(s). Since a fixed frequency interferer may increase the noise floor on adjacent channels, ARM may use increased noise floor threshold on certain channels to make RF management decisions and/or avoid using adjacent channels.

The occupied bandwidth and center frequency information provided by the classifier is used by ARM to avoid channels that fall within the interferer's frequencies of operation whenever possible.

ARM may obtain all the classification related information from a hybrid AP/SM or a dedicated SM. The classification information coupled with the neighborhood AP list is used to estimate the impact of the interferers on a specific set of APs in making RF management decisions.

If all or most of the channels have one or more type of interference, the interferer duty cycle information is used by ARM to make RF management decisions. The signal strength of the interferers alone is not sufficient to indicate the level of interference introduced by these devices and how these interferers affect Wi-Fi communication. The duty cycle provides additional information on the amount of time the interferer is active. ARM uses this information to choose a channel that has interferers with the least duty cycle.

The present invention may be realized in hardware, software, or a combination of hardware and software. The present invention may be realized in a centralized fashion in one computer system, or in a distributed fashion where different elements are spread across several interconnected computer systems such as nodes on a wireless network. Any kind of computer system or other apparatus adapted for carrying out the methods described herein is suited. A typical combination of hardware and software may be a general purpose computer system with the required hardware such as IEEE 802.11 radios and a computer program that, when being loaded and executed, controls the computer system such that it carries out the methods described herein.

The present invention also may be embedded in nontransitory form in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

I claim:

1. A non-transitory machine readable medium comprising instructions which, when executed by one or more hardware processors, causes performance of operations comprising:

detecting, by a network device, an interference on a first channel;

classifying, by the network device, the interference on the first channel to identify an interference type from a group comprising of a fixed frequency interference or a frequency hopper interference; and determining whether to switch the network device from communicating on the first channel to communicating on a second channel based on the interference type of the interference;

responsive at least to determining that the interference type is a fixed frequency interference, switching the network device from communicating on the first channel to communicating on the second channel;

responsive at least to determining that the interference type is a frequency hopper interference, refraining from switching the network device from communicating on the first channel to communicating on the second channel.

2. The medium of claim 1, further comprising:

subsequent to switching, by the network device, from the first channel to the second channel:

switching, by the network device, from the second channel back to the first channel in response to determining that the interference on the first channel is no longer being detected.

3. The medium of claim 1, wherein the interference type is identified based on one or more variables comprising: a frequency usage associated with the interference, an occupied bandwidth associated with the interference, a center frequency associated with the interference, and a duty cycle associated with the interference.

4. The medium of claim 1, wherein the network device switching from the first channel to the second channel is further in response to determining that the interference originated from a frequency hopping interfering device, operating on the first channel, that is known not to interfere with the second channel.

5. The medium of claim 1, wherein the network device refraining from switching from the first channel to the second channel is further in response to determining that the interference is originating from a frequency hopping interfering device interfering with both the first channel and the second channel.

6. The medium of claim 1, wherein the network device switching from the first channel to the second channel is further in response to determining that the first channel is rendered unusable during a time period while the interference is active.

7. A network device comprising:

a hardware processor;

the network device being configured to perform operations comprising:

detecting an interference on a first channel;

classifying the interference on the first channel to identify an interference type from a group comprising of a fixed frequency interference or a frequency hopper interference; and determining whether to switch from communicating on the first channel to communicating on a second channel based on the interference type of the interference;

responsive at least to determining that the interference type is a fixed frequency interference, switching from communicating on the first channel to communicating on the second channel;

responsive at least to determining that the interference type is a frequency hopper interference, refraining from switching from communicating on the first channel to communicating on the second channel.

8. The network device of claim 7, further comprising:

subsequent to switching, by the network device, from the first channel to the second channel:

switching, by the network device, from the second channel back to the first channel in response to determining that the interference on the first channel is no longer being detected.

9. The network device of claim 7, wherein the interference type is identified based on one or more variables comprising: a frequency usage associated with the interference, an occupied bandwidth associated with the interference, a center frequency associated with the interference, and a duty cycle associated with the interference.

10. The network device of claim 7, wherein switching from the first channel to the second channel is further in response to determining that the interference originated from a frequency hopping interfering device, operating on the first channel, that is known not to interfere with the second channel.

11. The network device of claim 7, wherein refraining from switching from the first channel to the second channel is further in response to determining that the interference is originating from a frequency hopping interfering device interfering with both the first channel and the second channel.

12. The network device of claim 7, wherein switching from the first channel to the second channel is further in response to determining that the first channel is rendered unusable during a time period while the interference is active.

\* \* \* \* \*